(12) United States Patent
Yavorsky

(10) Patent No.: US 8,562,875 B2
(45) Date of Patent: Oct. 22, 2013

(54) ADSORBENT FILTER MEDIA FOR REMOVAL OF BIOLOGICAL CONTAMINANTS IN PROCESS LIQUIDS

(75) Inventor: David P. Yavorsky, Bolton, MA (US)

(73) Assignee: EMD Millipore Corporation, Billerica, MA (US)

( * ) Notice: Subject to any disclaimer, the term of this patent is extended or adjusted under 35 U.S.C. 154(b) by 6 days.

(21) Appl. No.: 13/426,643

(22) Filed: Mar. 22, 2012

(65) Prior Publication Data

US 2012/0175805 A1 Jul. 12, 2012

Related U.S. Application Data

(60) Division of application No. 12/718,336, filed on Mar. 5, 2010, now Pat. No. 8,403,153, which is a continuation of application No. 11/656,184, filed on Jan. 22, 2007, now Pat. No. 7,673,757.

(60) Provisional application No. 60/774,773, filed on Feb. 17, 2006.

(51) Int. Cl.
*B29C 67/20* (2006.01)

(52) U.S. Cl.
USPC ............... 264/45.1; 264/628; 55/DIG. 5

(58) Field of Classification Search
USPC ........... 264/41, 45.1, 628; 210/502.1, 506; 55/522, DIG. 5; 96/108, 135, 153
See application file for complete search history.

(56) References Cited

U.S. PATENT DOCUMENTS

| | | | |
|---|---|---|---|
| 3,274,103 A | 9/1966 | Adams | |
| 3,351,495 A | 11/1967 | Larsen et al. | |
| 3,550,508 A | 12/1970 | Wartman, Jr. et al. | |
| 3,645,072 A | 2/1972 | Clapham | |
| 3,721,072 A | 3/1973 | Clapham | |
| 3,862,030 A | 1/1975 | Goldberg | |
| 4,061,807 A | 12/1977 | Shaler et al. | |
| 4,187,210 A | 2/1980 | Howard, Jr. | |
| 4,331,622 A | 5/1982 | Doi et al. | |
| 4,344,846 A | 8/1982 | Klein | |
| 4,664,683 A | 5/1987 | Degen et al. | |
| 4,665,050 A | 5/1987 | Degen et al. | |
| 4,687,573 A | 8/1987 | Miller et al. | |
| 4,753,728 A | 6/1988 | VanderBilt et al. | |
| 4,833,172 A | 5/1989 | Schwarz et al. | |
| 4,859,386 A | 8/1989 | VanderBilt et al. | |
| 4,877,679 A | 10/1989 | Leatherman et al. | |
| 4,892,779 A | 1/1990 | Leatherman et al. | |
| 4,968,555 A | 11/1990 | Landler | |
| 4,999,330 A * | 3/1991 | Bose et al. ............... 502/402 |
| 5,019,311 A | 5/1991 | Koslow | |
| 5,032,450 A | 7/1991 | Rechlicz et al. | |
| 5,033,465 A | 7/1991 | Braun et al. | |
| 5,078,132 A | 1/1992 | Braun et al. | |
| 5,147,722 A | 9/1992 | Koslow | |
| 5,196,262 A | 3/1993 | Schwarz et al. | |
| 5,331,037 A | 7/1994 | Koslow | |
| 5,332,426 A | 7/1994 | Tang et al. | |
| 5,486,410 A | 1/1996 | Groeger et al. | |
| 5,505,892 A | 4/1996 | Domme | |
| 5,639,550 A | 6/1997 | Lisenko | |
| 5,679,248 A | 10/1997 | Blaney | |
| 5,776,353 A | 7/1998 | Palm et al. | |
| 5,792,513 A | 8/1998 | Koslow et al. | |
| 5,882,517 A | 3/1999 | Chen et al. | |
| 5,928,588 A | 7/1999 | Chen et al. | |
| 5,948,557 A | 9/1999 | Ondeck et al. | |
| 6,114,023 A | 9/2000 | Schwarz et al. | |
| 6,165,519 A | 12/2000 | Lehrer et al. | |
| 6,227,383 B1 | 5/2001 | De Ruiter et al. | |
| 6,261,497 B1 | 7/2001 | Wong et al. | |
| 6,274,041 B1 | 8/2001 | Williamson et al. | |
| 6,321,915 B1 | 11/2001 | Wilson et al. | |
| 6,429,165 B1 | 8/2002 | Nastke et al. | |
| 6,468,942 B1 | 10/2002 | Sansalone | |
| 6,485,546 B2 | 11/2002 | Fuchs | |
| 6,524,489 B1 | 2/2003 | Palm et al. | |
| 6,565,961 B2 | 5/2003 | Koslow | |
| 6,630,016 B2 * | 10/2003 | Koslow ..................... 95/285 |
| 6,632,527 B1 | 10/2003 | McDaniel et al. | |
| 6,712,974 B1 | 3/2004 | Palm et al. | |
| 6,764,601 B1 * | 7/2004 | Levy et al. ............ 210/660 |
| 6,770,736 B1 | 8/2004 | Haftka et al. | |

(Continued)

FOREIGN PATENT DOCUMENTS

CN 1646678 A 7/2005
DE 37 19 233 A1 12/1988

(Continued)

OTHER PUBLICATIONS

European communication dated Oct. 22, 2007 in corresponding European Patent Application No. EP 07250624.9.

(Continued)

*Primary Examiner* — Frank Lawrence, Jr.
(74) *Attorney, Agent, or Firm* — Nields, Lemack & Frame, LLC

(57) ABSTRACT

Adsorbent filter media particularly suited for removal of biological contaminants in process liquids. A porous fixed bed of adsorbent material is formed, using only a granular adsorbent and a water-insoluble thermoplastic binder. The resulting composite filter allows for a higher amount of adsorbent with smaller adsorbent particles than conventional depth filters. Elimination of cellulose fiber, as well as the elimination of the thermoset binder, results in reduced contamination of the process liquid.

4 Claims, 3 Drawing Sheets

(56) References Cited

U.S. PATENT DOCUMENTS

| | | | |
|---|---|---|---|
| 6,793,866 | B2 | 9/2004 | Kelly et al. |
| 6,835,311 | B2 | 12/2004 | Koslow |
| 6,861,002 | B2 | 3/2005 | Hughes |
| 6,957,743 | B2 | 10/2005 | Johnston et al. |
| 6,959,820 | B2 | 11/2005 | Koslow |
| 7,112,280 | B2 * | 9/2006 | Hughes et al. ............ 210/502.1 |
| 7,144,533 | B2 | 12/2006 | Koslow |
| 7,673,757 | B2 | 3/2010 | Yavorsky |
| 8,403,153 | B2 | 3/2013 | Yavorsky |
| 2002/0069761 | A1 | 6/2002 | Fuchs |
| 2004/0159605 | A1 | 8/2004 | Hughes |
| 2005/0145579 | A1 | 7/2005 | Drohmann et al. |
| 2005/0211635 | A1 | 9/2005 | Yeh et al. |
| 2010/0159581 | A1 | 6/2010 | Yavorsky |
| 2013/0062280 | A1 | 3/2013 | Yavorsky |

FOREIGN PATENT DOCUMENTS

| | | |
|---|---|---|
| EP | 0 172 003 A1 | 2/1986 |
| EP | 0 517 189 A1 | 12/1992 |
| GB | 2 390 987 A | 1/2004 |
| JP | 5-345105 A | 12/1993 |
| JP | 7-116513 A | 5/1995 |
| JP | 7-124470 A | 5/1995 |
| JP | 11-503972 A | 4/1999 |
| JP | 2000-342917 A | 12/2000 |
| JP | 2002-302857 A | 10/2002 |
| JP | 2005-246260 A | 9/2005 |
| JP | 2005-527349 A | 9/2005 |
| WO | 97/29829 A1 | 8/1997 |
| WO | 98/14265 A1 | 4/1998 |
| WO | 98/43796 A1 | 10/1998 |
| WO | 00/18810 A2 | 4/2000 |
| WO | 01/87777 A2 | 11/2001 |
| WO | 03/084639 A2 | 10/2003 |
| WO | 03/097797 A2 | 11/2003 |
| WO | 2005/094966 A1 | 10/2005 |

OTHER PUBLICATIONS

European communication dated Nov. 18, 2008 in corresponding European Patent Application No. EP 07250624.9.

Analytical Advances; BioPharm May 2002; Charles Lambalot; "Strategies in Clarifying Mammalian Cultures" p. 74.

Recovery of Biological Products XI, Banff, Canada Sep. 14-19, 2003; Martin P. Smith et al.; "Selecting a Virus Reduction Filter and Optimising Performance During Process Scale-Up", 1 page.

Prashad et al.; "Depth Filtration: Cell Clarification of Bioreactor Offloads"; Filtration and Separation, Croydon, GB, vol. 43, No. 7, Sep. 2006, pp. 28-30, XP005630890.

The European Search Report dated May 18, 2007 in corresponding European Patent Application No. EP 07250624.9.

Chinese communication dated Oct. 24, 2008 in corresponding Chinese Patent Application No. CN 200710078971.8.

Indian communication dated Mar. 4, 2009 in corresponding Indian Patent Application No. IN 230/DEL/2007.

Japanese communication dated Apr. 28, 2009 in corresponding Japanese Patent Application No. JP 2007-38153.

Singapore communication dated Sep. 28, 2009 in corresponding Singapore Patent Application No. SG 200700656-2.

Singapore Communication dated Sep. 16, 2010 in corresponding Singapore Patent Application No. SG 200700656-2.

European Communication dated Mar. 30, 2010 in corresponding European Patent Application No. EP 07250624.9.

Japanese Communication dated May 11, 2010 in corresponding Japanese Patent Application No. JP 2007-38153.

Office Action mailed May 3, 2012 in corresponding U.S. Appl. No. 12/718,336.

Notice of Allowance mailed Nov. 27, 2012 in corresponding U.S. Appl. No. 12/718,336.

Office Action mailed Jun. 27, 2013 in corresponding U.S. Appl. No. 13/669,494.

* cited by examiner

ADSORBENT FILTER MEDIA FOR REMOVAL OF BIOLOGICAL CONTAMINANTS IN PROCESS LIQUIDS

This application is a divisional of U.S. patent application Ser. No. 12/718,336 filed Mar. 5, 2010 (now U.S. Pat. No. 8,403,153 issued Mar. 26, 2013), which is a continuation of U.S. patent application Ser. No. 11/656,184 filed Jan. 22, 2007 (now U.S. Pat. No. 7,673,757 issued Mar. 9, 2010), which claims priority of provisional application Ser. No. 60/774,773 filed Feb. 17, 2006, the disclosures of which are hereby incorporated by reference.

BACKGROUND OF THE INVENTION

Cellulosic depth filters, such as Millistak®+ filters commercially available from Millipore Corporation, are typically used in the production of biopharmaceuticals, as derived from mammalian cell culture for the purpose of clarifying various crude product fluids. These composite filters include a layer of tightly structured cellulosic depth media, and can be optimized to a specific application, such as retaining colloidal particles and cell debris or retaining whole cells and larger debris. They combine sequential grades of media in a single filter cartridge. These filters are most commonly used in polishing or secondary clarification processes to remove small quantities of suspended matter from aqueous product (protein) streams. The primary function of these filters is to protect or extend the service life of more expensive downstream separation processes, such as sterile filtration and affinity chromatography. That is, a common application for these filters is as "prefilters", protecting downstream equipment and media from colloidal contaminants and other cell debris. In addition, such depth filters are also used for the protection of viral clearance filters by removing trace quantities of agglomerated proteins.

It is also known in the industry that composite depth filters also can retain, to varying degrees, some soluble contaminants commonly found in mammalian cell cultures, such as nucleic acids, host cell proteins, lipids, surfactants, etc. This retention capability for certain soluble contaminants is based on the adsorptive properties of the depth filter media.

The filter media typically employed in these depth filters includes refined cellulose fibers (wood pulp and/or cotton derived), diatomaceous earth, and a water-soluble thermoset resin binder. The diatomaceous earth (a natural form of silica containing trace amounts of various silicates) in these composites is typically 40-60% by weight, and is believed to be the essential component, adsorbing colloidal size biological matter such as cell fragments, organelles and agglomerated proteins, as well as various soluble biochemicals such as proteins, lipids and nucleic acids.

However, one of the principal drawbacks of the use of these cellulosic depth filters for the production of parenteral drugs and other pharmaceuticals is the relatively high level of water-soluble contaminants they release into the system. Indeed, extensive pre-flushing is required to reduce the level of these organic and inorganic contaminants to acceptable levels prior to use. Furthermore, the maximum loading of diatomaceous earth adsorbent within the depth filter media is limited to about 60% by weight, and the minimum particle size for the adsorbent to be retained in the fiber matrix is about 10 microns.

It is therefore an object of the present invention to reduce or eliminate the release of contaminants from adsorbent filters.

It is another object of the present invention to increase the content or loading of adsorbent in filter media.

It is a further object of the present invention to provide a filter with smaller adsorbent particles in order to maximize the available surface area for adsorption.

Other objects and advantages of the invention will be apparent from the following detailed description and the accompanying drawings.

SUMMARY OF THE INVENTION

The problems of the prior art have been overcome by the present invention, which provides adsorbent filter media particularly suited for removal of biological contaminants in process liquids. A porous fixed bed of adsorbent material is formed, using only a granular adsorbent and a water-insoluble thermoplastic binder. The resulting composite filter allows for a higher amount of adsorbent with smaller adsorbent particles than conventional depth filters. Elimination of cellulose fiber, as well as the elimination of the water-soluble thermoset binder, results in reduced contamination of the process liquid. As a result, extensive pre-flushing is no longer required to reduce extraneous contaminants. Improved media performance is obtained by increasing the content of the adsorbent material, and/or by using smaller adsorbent media to maximize the available surface area for adsorption.

The resulting composite filter material is substantially or completely devoid of cellulose and thermoset binder, and can be placed in a clarifying system downstream of a bioreactor and upstream of a sterile filter. Other applications include pretreatment of cell culture fluids prior to viral clearance filtration as well as chromatographic separations.

DETAILED DESCRIPTION OF THE INVENTION

Figure 1:
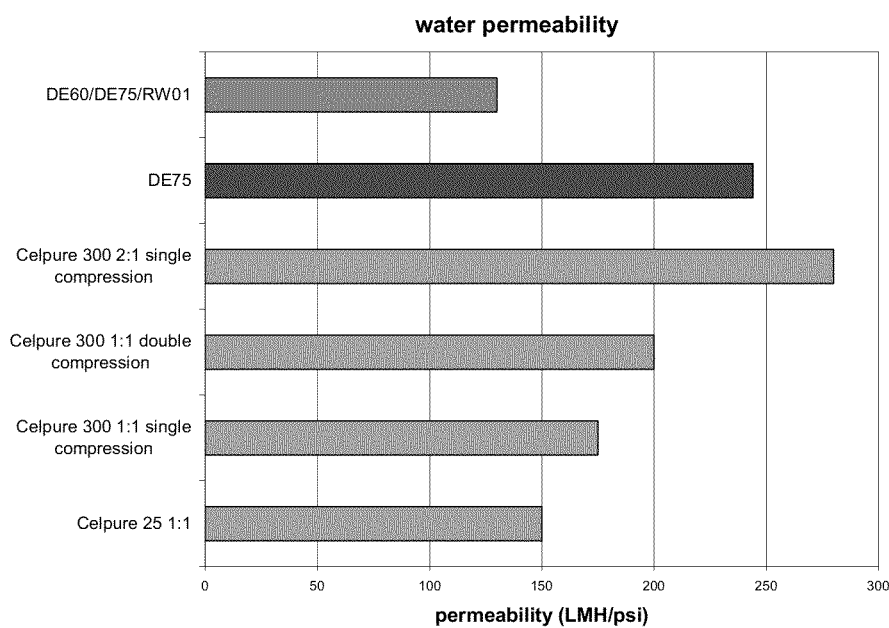
FIG. 1 is a graph comparing water permeability of composites of the present invention with conventional composites.

The filter media of the present invention includes an adsorbent material and a water-insoluble thermoplastic binder. This combination can be used to form a porous, fixed bed of adsorbent material with suitable mechanical properties for the application, including permeability, tensile strength and bending strength. The filter media is particularly useful as a depth filter.

Suitable adsorbent materials include diatomaceous earth, silica, porous glass, zeolites, and activated carbon. Diatomaceous earth is particularly preferred. Additionally, chromatography media, of any variety of forms (beads, ground powder, etc.) and surface chemistries (ion exchange, hydrophobic, etc.), can be used as adsorbents in such porous media. Suitable binders include thermoplastic binders such as polyolefins, preferably polyethylene, polypropylene or mixtures thereof. The binder is preferably used in bead, powder or fiber form. By proper choice of the binder (in terms of a sufficiently high melting or softening point), the media can be autoclaved or otherwise steam sterilized or gamma irradiated to help reduce or eliminate any biological contaminants therein.

The media fabrication process can depend on the binder form used. The media can be prepared by blending the binder with the adsorbent material, followed by fusing the adsorbent particles together such as by partially melting or softening the binder. For example, polyethylene powder can be blended dry (such as by shaking/tumbling for several minutes) with the adsorbent particles, such as diatomaceous earth or silica beads, in proportions from about 1:1 to about 1:3 binder: adsorbent, by weight. The resulting blended material can be placed in a mold and heated (e.g., in a heated hydraulic press) to a suitable temperature to fuse the adsorbent particles, such as 130° C. to 160° C. Diatomaceous earth and silica beads bound into 2-4 mm thick pads using ultra-high molecular weight polyethylene powder (Mipelon™), commercially available from Mitsui Chemical, have been formed by this method, with an average bead diameter of 20-30 microns. As the material heats and softens in the press, the compressive force should be periodically adjusted to maintain a constant force during the heat cycle (about 5 to 10 minutes).

Alternatively, a wet-laid process can be used to form the media, particularly where the binder is in the form of fibers. For example, fine polyethylene fibers (Fybrel™, from Mitsui Chemical) can be dispersed in isopropanol and water, then blended into a slurry with diatomaceous earth powder in proportions of from about 1:1 to about 1:3 binder:adsorbent, by weight. The slurry is transferred to a Buchner funnel holding a nominal 1 micron nonwoven support material in its base to prevent the fibers and adsorbent from passing straight through the perforations of the funnel. The bulk of the liquid is then drawn off through a vacuum flask. The formed disk is transferred to an oven for drying and thermally bonding the adsorbent particles together by partially melting or softening the polyethylene fibers.

Composite materials constructed as above exhibit very high permeability (high porosity) and low particle retention properties relative to the conventional cellulosic depth filter media conventionally available. Gravity settling of diatomaceous earth particles with polyethylene fiber or powder produces a low-density composite structure with relatively large void spaces.

To enhance the separation properties of the diatomaceous earth composite materials of the present invention, the material should be compacted or compressed prior to and/or during heating. For example, compressing the filter media samples for about 30 seconds using a pneumatic press in the range of 100-325 psi was found to be effective. The media samples do not relax substantially after compression; after heating to fuse the structure into a monolith, the media maintains its compressed thickness dimension. The composite can be compressed to about 50-70% of its original volume depending on composition and compression force.

The application of mechanical compression to the composite materials also can be used to regulate water permeability, which can approach that of standard cellulosic depth filter pads. FIG. 1 illustrates water permeability measurements (flow rate relative to pressure differential) of composites made from Celpure™ (Advanced Minerals) diatomaceous earth and Fybrel™ (Mitsui Chemical) polyethylene microfibers, compared to conventional Millistak®+ A1HC depth filter samples. The figure shows that the water permeabilities of the instant composites are of a range consistent with that of the commercial cellulosic depth filter media.

A third granular or fibrous component may be added to the adsorbent/binder mixture as a means of manipulating the permeability of the product to allow for more effective use of the contained adsorbent. The additive may be a functional adsorbent or inert material but must be of a size and quantity to measurably affect the permeability of the media. Test results have shown that affecting media permeability in this manner does not substantially compromise (reduce) the adsorbent capacity of the media. Creating selectively larger flow channels within the media allows for deeper/broader penetration of the process fluid within the porous matrix that can compensate effectively for the overall lower adsorbent content of the media.

In addition to particle capture, the adsorbent porous monoliths of the present invention have significant advantages over conventional cellulosic adsorbent depth filters, particularly with regard to water extractibles. Any extractible materials are a serious concern in the production of parenteral pharmaceuticals. The conventional cellulosic depth media is known to have a relatively high extractible loading that requires extensive flushing prior to use. The present inventors have demonstrated that the extractibles that contribute to conductivity (inorganics) do not solely or predominantly derive from the diatomaceous earth. Indeed, the composite materials of the present invention, devoid of cellulose and thermoset binder, result in a reduction in effluent conductivity of 75-90% compared to conventional cellulosic media. The elimination of cellulose and substitution of the thermoset water-soluble resin binder with a water-insoluble binder such as polyethylene result in DE-based media having a drastically lower amount of inorganic extractibles. For users of such materials, there is a considerable benefit in reducing flushing requirements with lower risk of product contamination.

In general terms, one preferred method for preparing a preferred composite filter materials of the present invention is as follows. Ultra high molecular weight polyethylene powder, with an average particle size of 25 µm, and natural diatomite having a particle size range of 0.2-25 µm, are dry mixed, batchwise, in a rotary V-blender that includes an internal high-speed agitator. The mixture is transferred from the blender to a powder dispenser (or applicator). The applicator dispenses the mixed powders onto a moving web of porous non-woven polyester material at room temperature at a controlled thickness of up to 0.5 inch. Multiple applications of different powder mixtures could be applied in similar fashion to create a gradient composition adsorbent media.

The loose mixed powder layer is then lightly compacted and leveled by contact with an overhead roller before being heated from below by electrically-heated plates and simultaneously from above by IR lamps to soften the polyethylene powder. The temperature of the heated plates escalates along the production path to a final temperature of approximately 340° F. The temperature of the powder mixture is held at a maximum of around 340° F. for several minutes before applying an additional non-woven polyether web on top.

The composite material is then continuously compressed at approximately 100 psi to a thickness of 0.10-0.20" by passing through two heated calender rollers also set to a temperature of around 340° F. The finished material is then allowed to cool on a metal plate open to the air.

Example 1

Samples of various blends of diatomaceous earth and polyethylene microfibers fused into pads of approximately 2-4 mm in thickness were tested in a standard clarification process step related to protein product recovery from mammalian cell cultures. The test was to challenge the adsorbent media with a suspension of *E. coli* lysate (in buffer) under constant flow conditions while monitoring the pressure rise on the media sample (rate of plugging) as well as the quality of the effluent relative to the volume of fluid processed. Effluent or filtrate quality was measured by directly filtering the fluid through a 0.2 micron sterilizing grade membrane filter, in this case Durapore® GV. These experimental composite samples were again compared to Millistak®+ cellulosic depth filter media.

Figure 2:
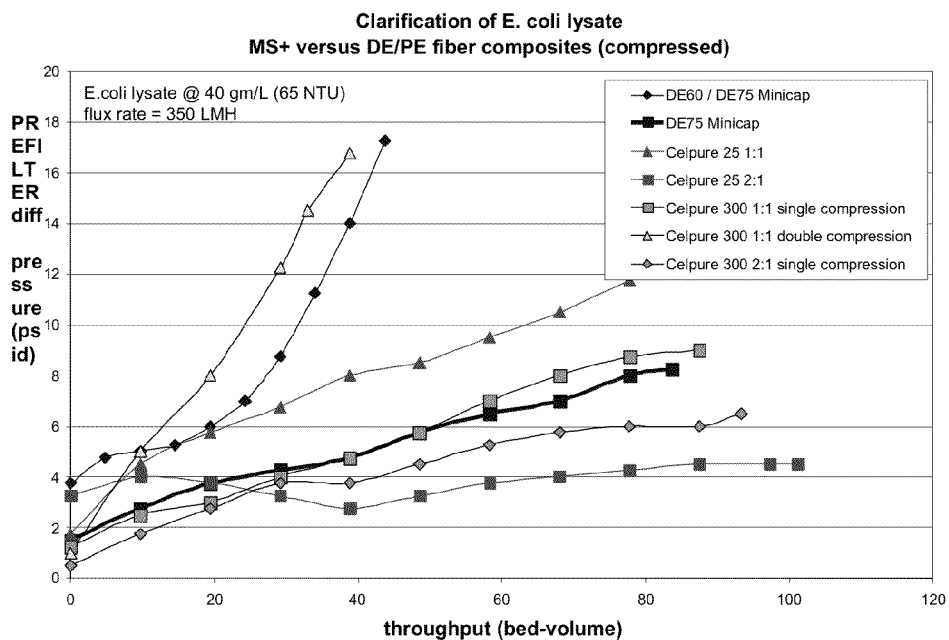
FIG. 2 is a graph of pre-filter differential pressure versus throughput.
Figure 3:
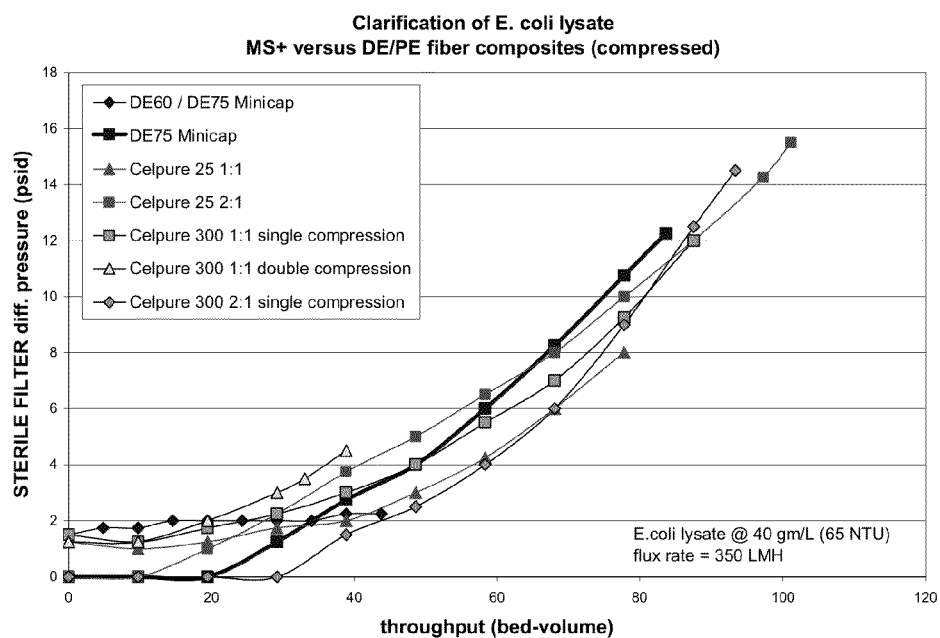
FIG. 3 is a graph of sterile filter differential pressure versus throughput.

FIGS. 2 and 3 show the pressure profiles for the adsorbent media samples and Millistak®+ pads and the associated sterile filter profiles. Throughput is reported as the volume of fluid processed relative to the volume of the depth filter media employed (bed volume).

As shown in the figures, the DE/PE fiber composites were capable of matching the tightest or most retentive grade of Millistak®+ DE media (75 grade) in both throughput and retention. The various composite samples have rates of rise in pressure that lie at or below that of the 75DE Millistak®+ media. In addition, the rates or pressure rise on the downstream sterile filters are all nearly equivalent for the composites of the invention as compared to 75DE Millistak®+ media, indicating a comparable level of particle retention.

Example 2

Samples of diatomaceous earth fused into a fixed-bed pad using polyethylene powder (Mipelon™, Mitsui Chemical) were tested for their capacity to protect a viral retentive membrane, NFP Viresolve 180. In this test, the DE/PE composite (approximately 3 mm thick) was challenged with a solution of polyclonal human IgG protein at a concentration of 0.5 µm/L. The Viresolve® membrane typically yields a capacity of approximately 150 L/m$^2$ for this feedstock. Using the Millistak®+ A1HC depth filter to pre-treat this feedstock for the removal of protein agglomerates, the Viresolve membrane capacity can be increased to the range of 750-1500 L/m$^2$. Two samples of diatomaceous earth (Celpure 25 and Celpure 300 (Advanced Minerals)) were blended with the Mipelon PE powder and formed into 2-3 mm pads after heating (without compression). The DE/PE composite samples were then used to pre-treat the IgG feedstock and the filtrate was again processed through Viresolve 180 to determine the effect on membrane capacity.

The Celpure 25 (a fine grade DE) yielded a Viresolve capacity of 440 L/m$^2$ and the Celpure 300 (a larger coarse grain DE) yielded a Viresolve capacity of >1000 L/m$^2$. These tests indicate that a monolith of diatomaceous earth formed with a PE powder binder can provide the same level of protection for a viral retentive membrane (by the removal of protein agglomerates) as currently provided by cellulosic depth filters such as Millistak®+ depth filters.

Example 3

Figure 4:
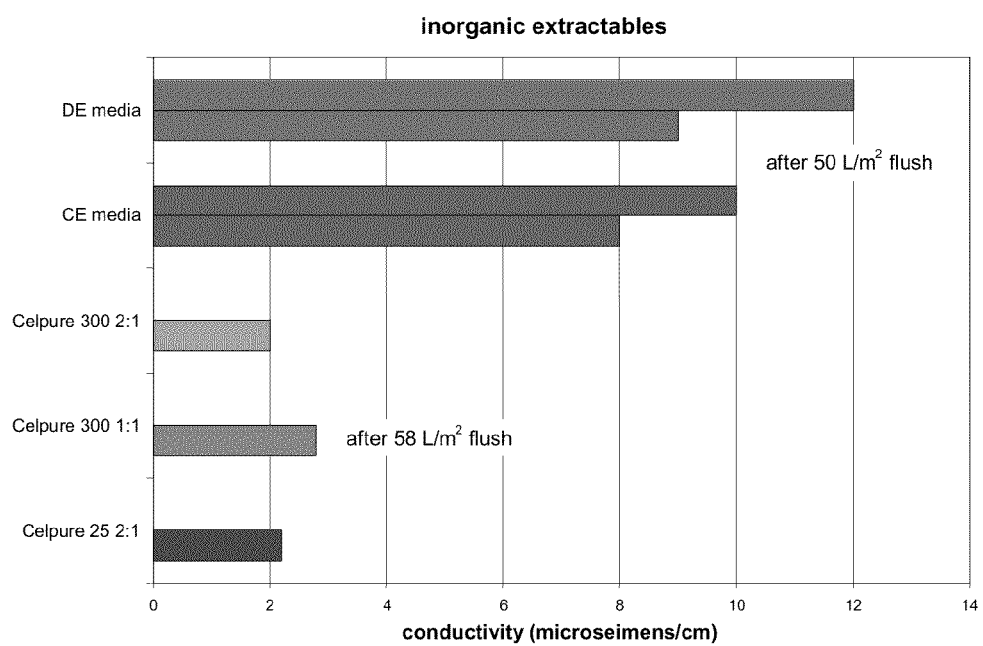
FIG. 4 is a chart of conductivity values of effluent passing through various media.

To gauge the cleanliness of the composite materials of the invention, material samples were flushed with clean deionized water and the conductivity of the effluent, after a prescribed flush volume, was measured. Conductivity values were taken to represent the level of soluble metals present in the filter media. FIG. 4 shows the conductivity values obtained for various DE/PE composite samples relative to commercial Millistak®+ depth filter samples.

The Millistak®+ DE media is a composite of cellulose and diatomaceous earth plus a water-soluble thermoset resin binder. The CE media contains only cellulose fiber and binder. It is evident from these measurements that those extractibles that contribute to conductivity (inorganics) do not derive predominantly from the diatomaceous earth. Comparing these values to the DE/PE composites tested, there is reduction in effluent conductivity of 75-90%.

Example 4

10-20% of 75-100 micron porous glass beads when added to a 2:1 mixture of powdered polyethylene (20-30 micron) and diatomite (0.5-10 micron) can reduce the hydraulic permeability of the finished media by 10-30% with no measurable loss in adsorbent capacity as measured by particle capture and process volume.

What is claimed is:

1. A method of forming a heat fused composite filter media pad comprising the steps of:
  a) providing an adsorbent material selected from diatomaceous earth, silica, glass, and a zeolite, and a water-insoluble thermoplastic binder dispersed in water selected from polyolefins, polyethylene, polypropylene, ultra-high molecular weight polyethylene, and mixtures thereof;
  b) blending the adsorbent material and the binder dispersed in water in a binder:adsorbent proportions about 1:1 to about 1:3 by weight;
  c) forming a liquid slurry from the blended adsorbent material and binder;
  d) filtering the slurry to draw off the liquid;
  e) thermally bonding the adsorbent particles together by partially melting or softening the binder; and
  f) forming a heat fused composite filter media pad substantially devoid of cellulose and a thermoset binder, having a thickness about 2 mm to 4 mm.

2. The process of claim 1, wherein the adsorbent material is diatomaceous earth powder and the binder is polyethylene fibers.

3. The process of claim 1, furthering comprising adding porous glass beads in step (b).

4. The process of claim 3, wherein the diatomaceous earth has a particle size range about 0.2 microns to 25 microns, and the porous glass beads have an average bead diameter about 20 microns to 30 microns.

* * * * *